US012046439B2

(12) United States Patent
Riley et al.

(10) Patent No.: US 12,046,439 B2
(45) Date of Patent: Jul. 23, 2024

(54) METHOD FOR TUNING WORK FUNCTION USING SURFACE PHOTO VOLTAGE AND PRODUCING ULTRA-LOW-WORK-FUNCTION SURFACES, AND DEVICES OPERATIONAL THEREWITH

(71) Applicant: The Board of Trustees of the Leland Stanford Junior University, Stanford, CA (US)

(72) Inventors: Daniel Riley, San Francisco, CA (US); Kunal Sahasrabuddhe, Austin, TX (US); Igor Bargatin, Wynnewood, PA (US); Jared Schwede, Menlo, CA (US); Zhixun Shen, Stanford, CA (US); Nicholas A Melosh, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 17/538,280

(22) Filed: Nov. 30, 2021

(65) Prior Publication Data

US 2022/0093357 A1 Mar. 24, 2022

Related U.S. Application Data

(62) Division of application No. 14/333,431, filed on Jul. 16, 2014, now Pat. No. 11,205,554.
(Continued)

(51) Int. Cl.

| | |
|---|---|
| ***H01J 1/15*** | (2006.01) |
| ***H01J 1/13*** | (2006.01) |
| ***H01J 1/20*** | (2006.01) |

(52) U.S. Cl.
CPC ................ *H01J 1/15* (2013.01); *H01J 1/135* (2013.01); *H01J 1/20* (2013.01)

(58) Field of Classification Search
CPC ................. H01J 1/15; H01J 1/135; H01J 1/20
See application file for complete search history.

(56) References Cited

U.S. PATENT DOCUMENTS 3,173,032 A 3/1965 Maynard
3,201,618 A 8/1965 Coleman
(Continued)

FOREIGN PATENT DOCUMENTS

JP H0575104 3/1993
JP 2011124412 6/2011
(Continued)

OTHER PUBLICATIONS

Kim et al., "Kelvin probe and ultraviolet photoemission measurements of indium tin oxide work function: a comparison", 2000, Synthetic Metals v111-112, pp. 311-314.
(Continued)

*Primary Examiner* — Lindsey A Buck
(74) *Attorney, Agent, or Firm* — LUMEN PATENT FIRM

(57) ABSTRACT

The embodiments provide a thermionic emission device and a method for tuning a work function in a thermionic emission device is provided. The method includes illuminating an N type semiconductor material of a first member of a thermionic emission device, wherein a work function of the N type semiconductor material is lowered by the illuminating. The method includes collecting, on one of the first member or a second member of the thermionic emission device, electrons emitted from one of the first member or the second member.

16 Claims, 8 Drawing Sheets

Related U.S. Application Data

(60) Provisional application No. 61/846,728, filed on Jul. 16, 2013.

(56) References Cited

U.S. PATENT DOCUMENTS

| | | | | |
|---|---|---|---|---|
| 5,612,588 | A | 3/1997 | Wakalopulos | |
| 5,675,972 | A | 10/1997 | Edelson | |
| 10,186,650 | B2 * | 1/2019 | Schwede | H10N 10/851 |
| 11,688,593 | B2 * | 6/2023 | Schmitt | H01J 45/00<br>310/306 |
| 2009/0127549 | A1 | 5/2009 | Walitzki | |
| 2010/0104450 | A1 | 4/2010 | Longoni | |
| 2010/0139771 | A1 * | 6/2010 | Schwede | H01J 45/00<br>136/261 |
| 2011/0100430 | A1 | 5/2011 | Zak, Jr. | |
| 2011/0139205 | A1 | 6/2011 | Kimura | |
| 2011/0221328 | A1 | 9/2011 | Nemanich | |
| 2011/0226299 | A1 | 9/2011 | Makansi | |
| 2014/0187016 | A1 | 7/2014 | Malhotra | |

FOREIGN PATENT DOCUMENTS

| | | |
|---|---|---|
| JP | 2012514856 | 6/2012 |
| WO | WO2010078521 | 7/2010 |

OTHER PUBLICATIONS

Schwede et al., "Photon-enhanced thermionic emission from heterostructures with low interface recombination", 2013, Nature Communications.
Schwede et al., "Photon-enhanced thermionic emission for solar concentrator systems", 2010, Nature Materials v9.
Varpula et al., "Diffusion-emission theory of photon enhanced thermionic emission solar energy harvesters", 2012, J Appl. Physics v112.

* cited by examiner

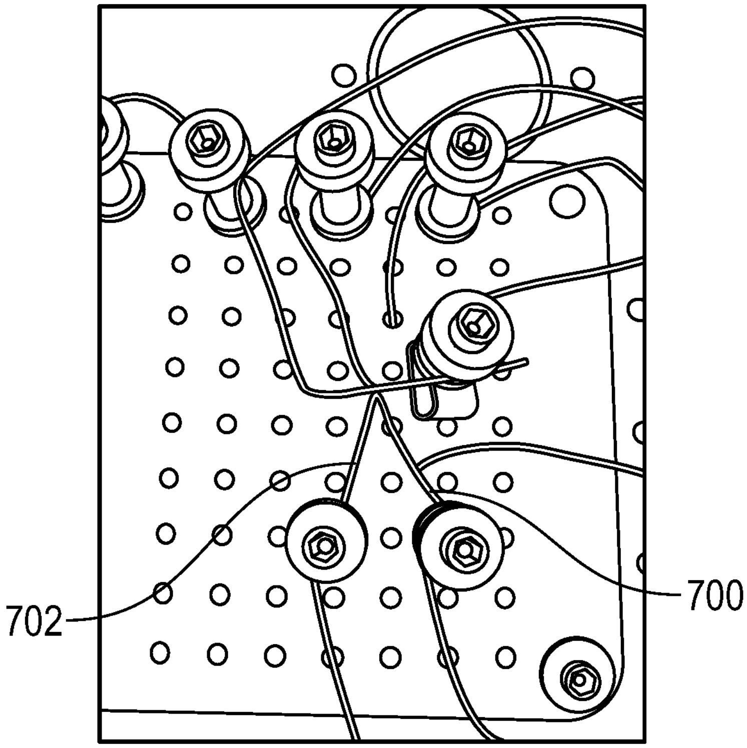

FIG. 7

Sample Preparation

- Solvent Clean
- 60s 10% HCl and DI $H_2O$ Rinse in air ($N_2$ in Future)
- 50 nm Nickel Contacts
- Thermocouple and Copper Wire Attached with Silver Paste. Air Curved for 1h. 200C Cured for 2h.
- Solvent Clean
- 60s 10% HCl and DI $H_2O$ Rinse Under $N_2$ Atmosphere
- Device and Chamber Assembled Under $N_2$ Atmosphere
- Briefly Exposed to Air When Chamber is Connected to Pump
- Pumped Overnight to 9.7E-7 torr

FIG. 8

METHOD FOR TUNING WORK FUNCTION USING SURFACE PHOTO VOLTAGE AND PRODUCING ULTRA-LOW-WORK-FUNCTION SURFACES, AND DEVICES OPERATIONAL THEREWITH

This application is a divisional of U.S. patent application Ser. No. 14/333,431, filed Jul. 16, 2014 and hereby incorporated by reference in its entirety. Application Ser. No. 14/333,431 claims the benefit of U.S. Provisional Application No. 61/846,728 filed Jul. 16, 2013, which is hereby incorporated by reference.

BACKGROUND

Thermionic energy converters offer the prospect of converting high temperature heat in a relatively high temperature range directly to electricity. This high temperature heat could be generated by nuclear or concentrated solar sources. In addition, thermionic energy converters offer the prospect of performing a topping conversion cycle in conventional steam electrical power plants. In any of these electrical energy generation applications it is desirable to obtain high conversion efficiencies. Generally, system efficiencies on the order of 10-20% have been obtained by utilizing a high work function emitter in conjunction with a lower work function collector. Thus, thermionic energy converters are limited in efficiency by the work functions of the materials available. Also, some of the materials used in thermionic energy converters, such as diamond, are extraordinarily expensive. It is within this context that the embodiments arise.

SUMMARY

In some embodiments, a method for tuning a work function in a thermionic emission device is provided. The method includes illuminating an N type semiconductor material of a first member of a thermionic emission device, wherein a work function of the N type semiconductor material is lowered by the illuminating. The method includes collecting, on one of the first member or a second member of the thermionic emission device, electrons emitted from one of the first member or the second member.

In some embodiments, a thermionic emission device is provided. The device includes a first member having an N type semiconductor material and a lighting member configured to illuminate the N type semiconductor material of the first member, wherein a work function of the N type semiconductor material is decreased as a result of such illumination. The device includes a second member arranged to collect electrons emitted by the first member or to emit electrons that are collected by the second member.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 7 is a photograph of a variation of the thermionic energy converter of FIG. 3, with a heated cathode (lower) emitting electrons towards an anode made of N doped gallium arsenide (upper). The anode is backed by a thermocouple.

FIG. 8 is a chart showing sample preparation of the anode of FIG. 7.

DETAILED DESCRIPTION

The embodiments provide for tuning a material's work function and for producing a material surface with an ultra-low-work-function for a variety of applications in thermionic energy conversion devices and other vacuum electronics. This method may also be used to create an entirely new class of devices based on room temperature electron emission.

The work function is defined as the energy difference between a material's Fermi level and the vacuum level, i.e., the energy required to remove an electron from the surface of the material. The work function is one of the fundamental properties of a surface. For example, the thermionic electron current density, J, emitted by a surface is governed by the work function W as described by the Richardson-Dushman (RD) equation, J=A T^2 exp(−W/kT), where A is the RD constant and T is the temperature. The RD equation shows that the thermionic current will increase when the work function is decreased. The work function also governs the electric potential difference between two contacting electrodes (contact potential) and the photoemission threshold. The ability to control a material's work function is therefore of critical technological importance, because these surface phenomena are exploited in areas including solar and thermal energy conversion, light detection, spectroscopy, microscopy, and e-beam lithography.

Figure 1:
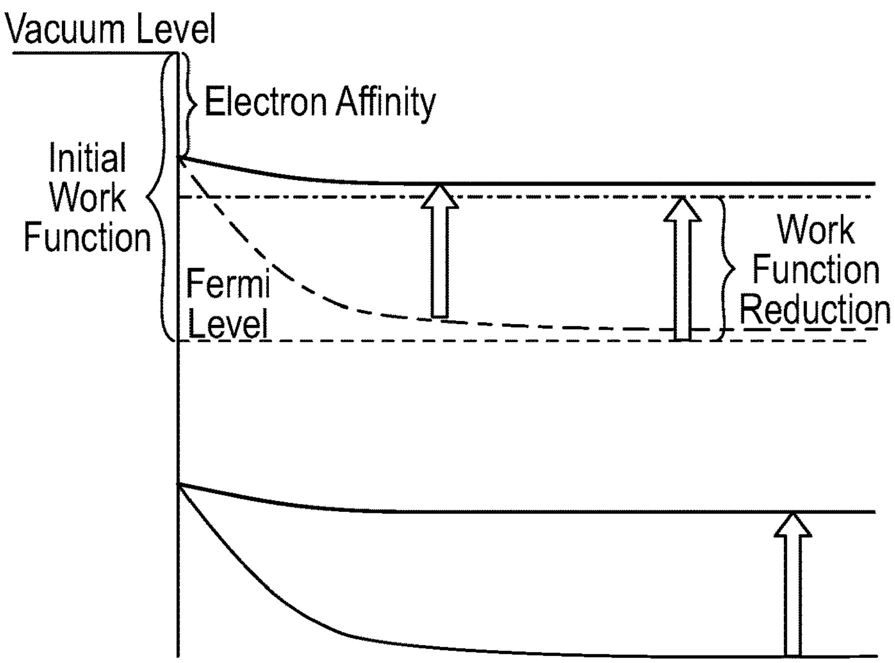
FIG. 1 is an energy band diagram showing upward band-bending resulting from the surface photovoltage effect (SPE).

In the present method and devices, the surface photovoltage effect is used in combination with a work-function lowering coating on an n-type semiconductor to induce an ultra-low work-function surface. In an n-type semiconductor the Fermi level is near the conduction band. However, at the surface, defect-states often pin the Fermi level close to midgap. This results in an internal electric field or depletion region near the surface that drives electrons away from the surface and holes towards the surface. This effect is known as "upward band-bending". When the surface is illuminated with light that has energy greater than the bandgap, holes are generated and swept towards the surface by the internal electric field. If enough charge builds up, the internal electric field is screened by the holes, and the bands flatten. This is referred to as the "surface photovoltage effect". The surface photovoltage is essentially the change in the amount of surface band bending under illumination. The amount of band bending in the dark is usually approximately half of the bandgap, corresponding to the difference between Fermi levels at the surface (close to midgap) and in the bulk (close to conduction band). As a result, the magnitude of the obtainable surface photovoltage (SPV) is also usually limited to half the bandgap, with half the bandgap achieved if the bands flatten completely under illumination. Since vacuum level is fixed with respect to the conduction band edge immediately at the surface, the SPV causes the bulk conduction band to move closer to the vacuum level, and thus the Fermi level moves closer to the vacuum level. The work function reduction is equal to the SPV, because the band flattening reduces the difference between the Fermi level and the vacuum level as shown in FIG. 1. The SPV generally increases with higher illumination intensity, larger bandgap, and lower recombination. When the SPV effect is induced at a surface that already has a work function lowering coating, record low work functions can be realized.

Figure 2:
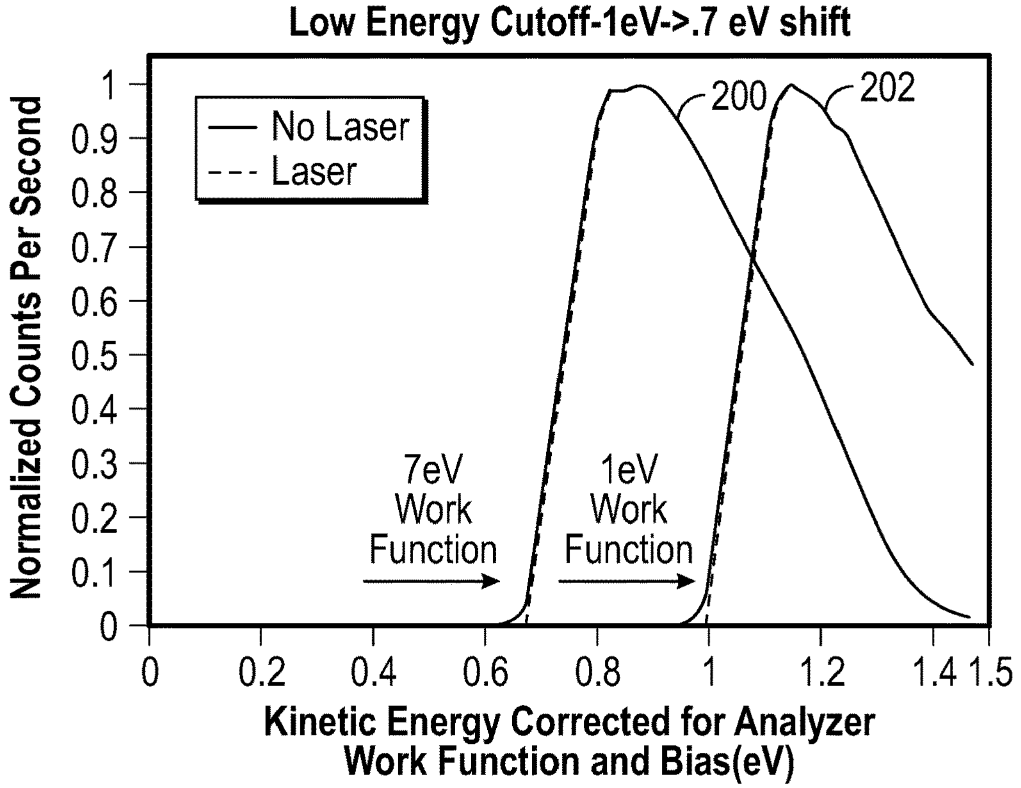
FIG. 2 is an emissions diagram showing electron emissions from two surfaces. One surface has a shift resulting from the surface photovoltage effect.
Figure 3:
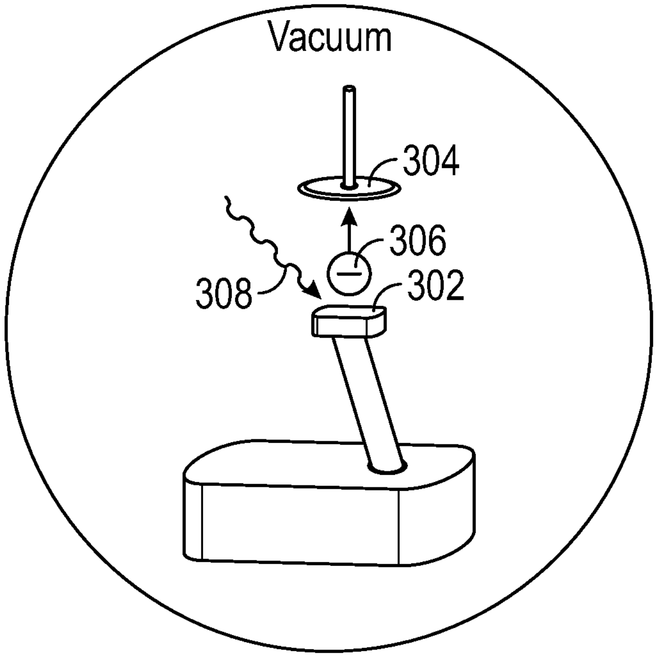
FIG. 3 is a drawing of a thermionic energy converter (TEC) operating with a heated cathode, emitting electrons, and an anode with a work function shifted through application of the surface photovoltage effect.

Experiments conducted at SSRL (Stanford Synchrotron Radiation Light Source) on beamline 8-1 demonstrate this effect and the results are illustrated in FIG. 2. The sample was an n-type wafer of GaAs that had been cleaned and coated with Cs—O in an ultra-high vacuum chamber to reduce the work function to ~1 eV (electron volts) as illustrated in trace 202. The sample was then illuminated with 532 nm (nanometers) light and the work function was measured to be ~0.7 eV as illustrated in trace 200. The SPV effect therefore caused a 0.3 eV work function reduction. This is 0.2 eV lower than a previous record of 0.9 eV, reported for phosphorous doped diamond. FIG. 3 is an image of the sample in the experimental setup.

Thermionic energy converters (TECs) are solid state heat engines which directly convert heat into electricity. A TEC consists of a metallic cathode which is heated to generate electric current that is collected by a cooler low work function anode. The voltage output of a TEC is approximately the difference of the work function of the cathode 400 and anode 402 of FIG. 4. The minimum effective operating temperature of a TEC is proportional to the anode work function, T~700 degrees K×W [eV]. TECs were never realized commercially in part due to high operating temperatures (>1000 degrees K) and low efficiencies (~10%) related to high anode work functions of ~1.5 eV. The anode work function is important, as it is essentially the figure of merit for thermionic energy converters.

TEC anodes have been made using materials with work functions of 1.5 eV, but the optimal work function of a room temperature anode is about 0.5 eV. While there is no known fundamental limit on how low the work function of a surface may be, the lowest previously reported values are ~1 eV. However, these require pristine surfaces only achievable in ultra-high-vacuum rendering them unsuitable for TECs and PETE devices. The method described herein may be used to lower the work function of chemically stable, moderately low-work-function (1-2 eV) semiconductor surfaces to values that are optimal for TECs and PETE devices (0.5-1 eV). This will enable TECs to approach the thermodynamic limit of efficiency.

Figure 5:
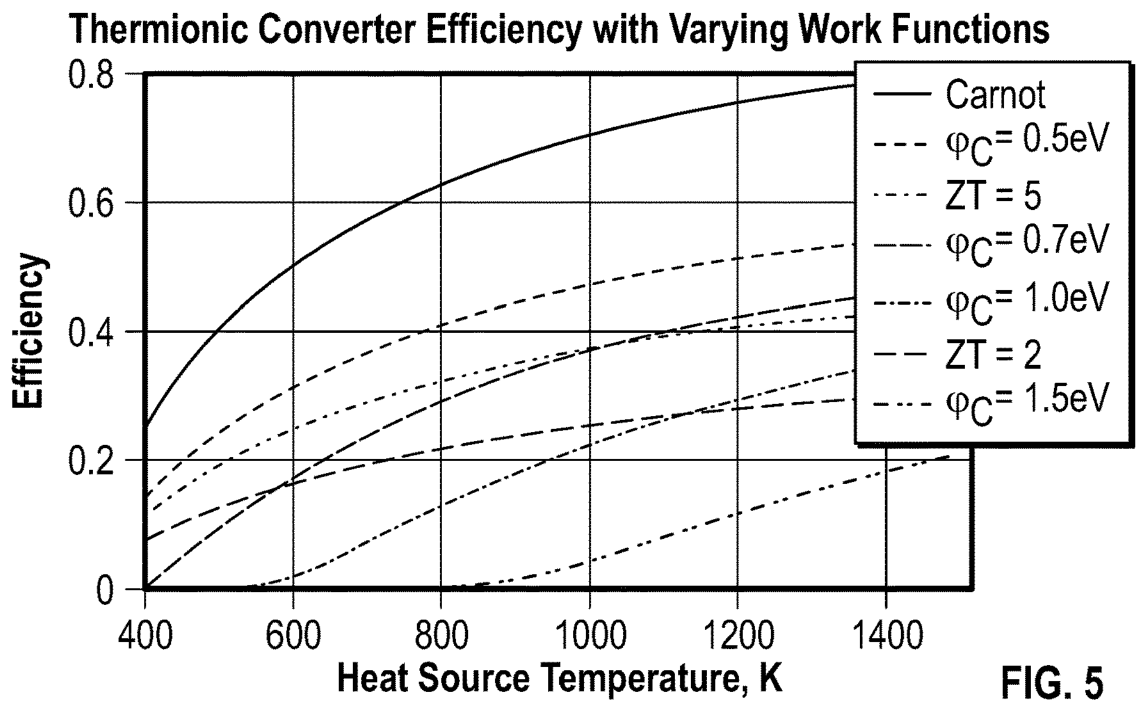
FIG. 5 is an efficiency diagram showing efficiency of a thermionic energy converter, such as shown in FIG. 3, increasing with decreasing work function, and increasing with increasing temperature.
Figure 6:
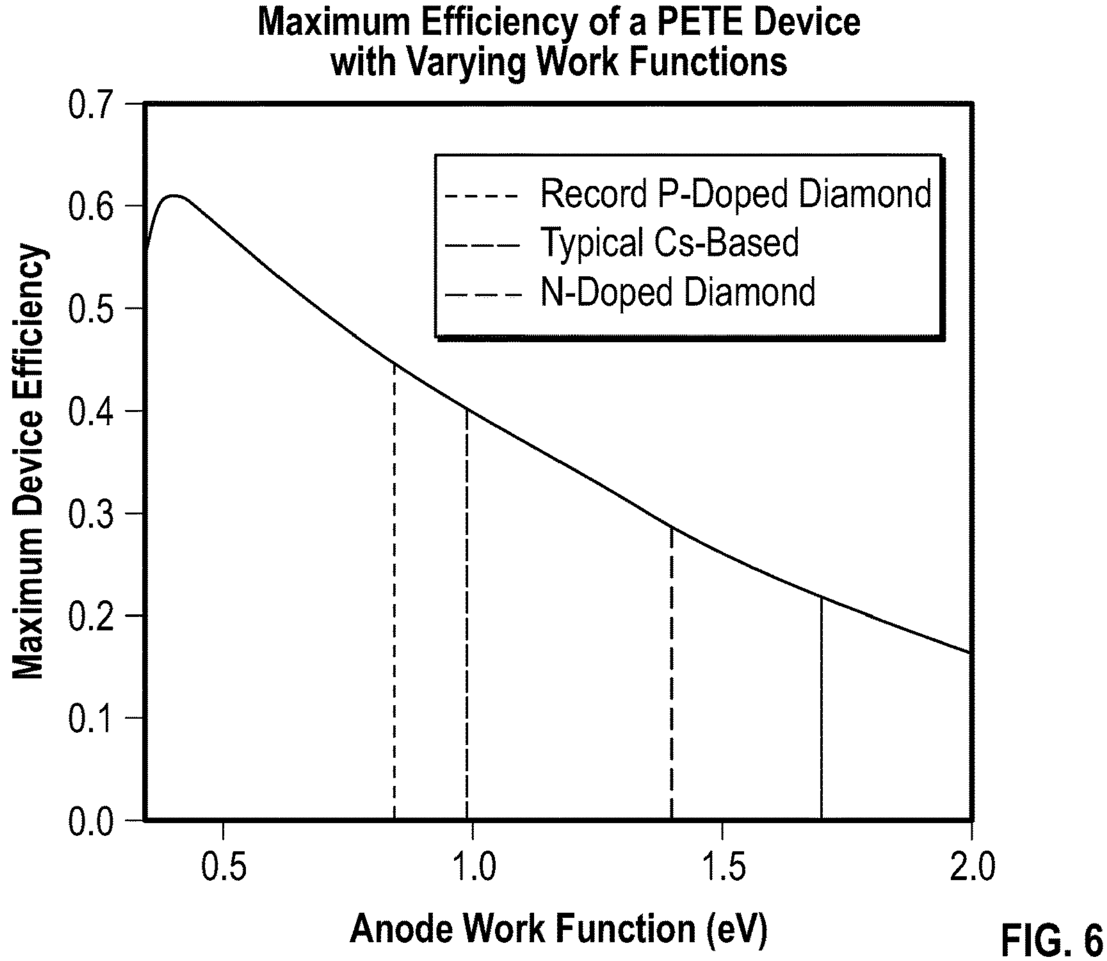
FIG. 6 is an efficiency diagram showing device efficiency versus anode work function, for thermionic energy converters such as shown in FIG. 3.

System-level calculations show that operating temperatures below about 1000 degrees K are achievable and the efficiency of TECs can approach and exceed 40% if an anode with a work function of less than 1 eV is used as illustrated by the graph of FIG. 5. These operating parameters make TECs a very attractive technology if low enough anode work function values are achieved. Additionally, PETE energy converters, which have a similar architecture to TECs, can also benefit from an ultra-low work function anode for the same reasons. A PETE device may achieve a solar conversion efficiency of nearly 60% if a 0.5 eV work function anode is used as illustrated by the graph of FIG. 6.

The present method may also be used in electron emitter applications. Many electron emitters operate by heating a filament to extremely high temperatures to cause thermionic emission. According to the Richardson-Dushman equation thermionic emission may occur at room temperature from surfaces with a work function of ~0.5 eV or lower, which may be achievable with the present method. Emission from such surfaces may also be optically switched on and off quickly with a time scale on the order of the minority carrier recombination time. Room temperature electron emitters, an entirely new class of devices, could be useful in numerous applications, including scanning electron microscopes, electron guns, klystrons, magnetrons, THz sources, and traveling wave tubes.

The method described herein, and variations thereof may be used to create lower work functions than ever achieved before. A work function of 0.7 eV has already been achieved with the present method. The most common method for creating ~1 eV work function surfaces (Cs+O coating on a metal or semiconductor) requires ultra-high vacuum and has poor chemical stability. More chemically stable coatings such as Ba+O do not have such a low function. The method described herein allows the use of coatings that are simpler to create and are more robust.

Most electron emitters operate by heating to cause thermionic emission. Extremely high temperatures are required, because work functions are generally rather high, which limits the types of materials that may be used. The present method will enable electron emission at relatively low temperatures, including room temperature, opening up a variety of new applications and material options. This method may be used to create low-work-function electron collector or electron emitter, or both, as stated in the device applications section.

The semiconducting material may be varied. The effect is very general, and should be usable with virtually any semiconductor. Some examples include gallium arsenide, silicon, gallium nitride, silicon carbide, and zinc oxide. The doping of the semiconductor may also be varied in concentration or it may also be p-type instead of n-type. In a p-type material, the SPV effect will increase the work function. If a p-type material is being used as an electron emitter, then illuminating the surface may increase the work function enough to shut off the emission current. Therefore the SPV effect may also be used in a p-type material for tuning the work function and fast switching of electron emission.

The work function lowering coating may be varied for various properties such as thermal or chemical stability. Some possibilities include Cs, Cs+O, Ba, Ba+O, Sr, Sr+O, Ca, or Ca+O. Illumination of the semiconductor surface may be achieved through passive or active methods. An example of a passive method may be in a TEC that is heated by concentrated sunlight. The semiconductor anode may passively absorb a small fraction of the total sunlight to induce the SPV effect. An example of an active method would be to illuminate the anode surface using a dedicated light emitting diode or laser.

The embodiments described herein use surface photovoltage in n-type semiconductor, which is a simpler device structure than a surface with incorporated p-n junction. The surface with the incorporated p-n junction also suffers from many additional mechanisms for electron recombination. For example, the downward surface band bending region of the surface p-type layer may trap electrons, leading to their recombination. Electrons may also recombine deeper (in the "bulk") of the p-type layer as the electrons would be minority carriers in this case. In contrast, in our approach, electrons are always in n-type material and therefore remain majority carriers throughout. Also, surface band bending is typically upward, which prevents trapping and recombination at the surface.

Low work function surfaces are used in numerous applications, and there is no known fundamental limit on how low the work function can be. By using a method to create a surface which has a work function low enough for low temperature thermionic emission, numerous known and unknown commercial opportunities may be enabled. If the work function can be lowered to about 0.5 eV, room temperature thermionic emitters will be realized leading to new applications. In addition, the efficiency of PETE or thermionic energy converters can be dramatically increased to over 50%, approaching the thermodynamic limits.

Example applications include:

Thermionic energy converters

Photon enhanced thermionic energy converters

Electron guns

Scanning electron microscopes

Klystrons

Magnetrons

THz (terahertz) sources

Traveling wave tubes

Advantages:

Very high efficiency thermal energy conversion possible

Enables the use of more thermally and chemically stable work-function-lowering coatings Fast optical switching of electron sources Room temperature electron emission applications FIGS. 1-15, as discussed below, show devices which make use of work function reduction achieved through the surface photovoltage effect. These devices include a thermionic energy converter in FIGS. 3-10 and 12, a refrigeration mode device in FIGS. 11 and 14, and a photon enhanced thermionic emission device in FIG. 13.

FIG. 1 shows application of the surface photovoltage effect to a doped semiconductor, which bends the Fermi level upward and reduces the work function. The Fermi level is the energy level which has an equal amount of electrons above and below. That is, an electron has an equal probability of having more energy or less energy than the Fermi level. The work function is the amount of energy, usually measured in electron volts, which is required to remove an electron from the Fermi level to the vacuum level. Illuminating the semiconductor, i.e., shining light on the surface of the semiconductor, generates electrons and holes through the photoelectric effect. The electrons will have more energy, which has the effect of raising the Fermi level, also known as upward band bending of the Fermi level. Also, it will now take less energy to remove an electron from the upwardly raised Fermi level to the unchanged vacuum level. Thus, illuminating the semiconductor reduces the work function, and is referred to as the surface photovoltage effect. In some of the disclosed method and devices, the semiconductor materials are N doped, which raises the Fermi level. Various embodiments use N doped gallium arsenide, although other semiconductors could be used.

FIG. 2 shows the effects of illuminating a particular sample of N doped gallium arsenide. The curve 202 on the right has about a 1 eV work function. The curve 200 on the left, with laser light applied to the sample, has about a 0.7 eV work function, as shown by the leftward shift of 0.3 eV.

FIG. 3 shows a thermionic energy converter, illuminated by laser light. Activity of the thermionic energy converter will be discussed in greater detail with reference to FIGS. 4 and 7. Semiconductor 302 is supported on a platform within a vacuum environment. In some embodiments the environment may be a plasma environment. Light source 308 illuminates semiconductor 302 and electrons 306 travel from semiconductor 302 to metal plate collector 304.

Figure 4:
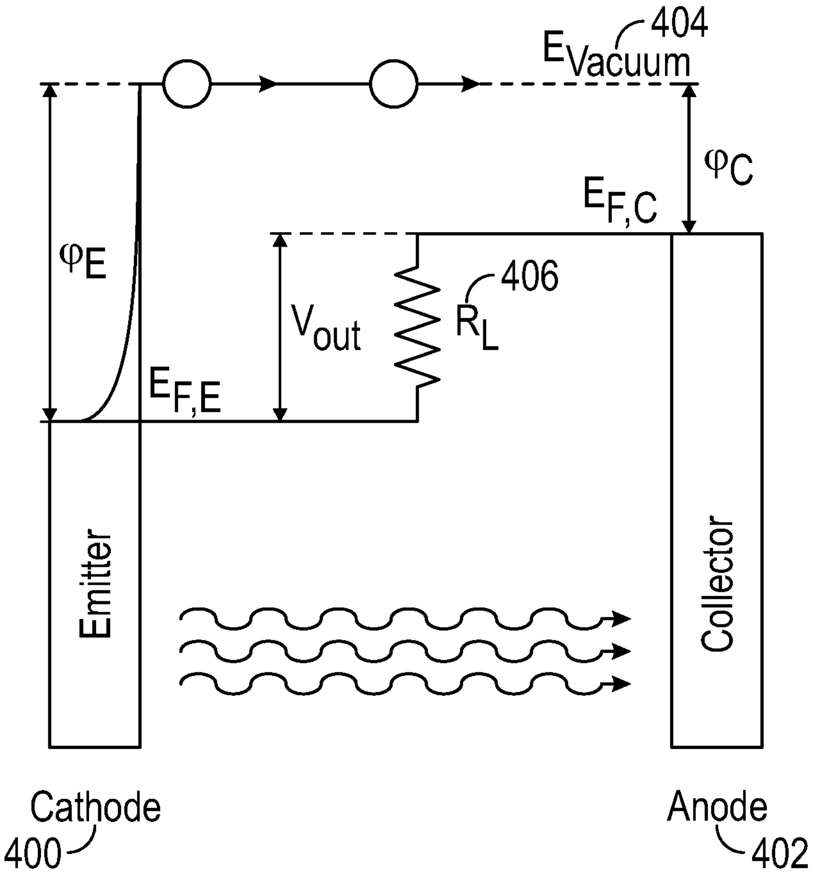
FIG. 4 is an energy level diagram showing operation of the thermionic energy converter of FIG. 3.

FIG. 4 shows operation of the thermionic energy converter. The emitter, which can also be called a cathode 400 in this configuration, is heated. In this particular operating scenario, the emitter is heated by passing the electric current through the wire of which the emitter is made. In further operating scenarios, an emitter of a thermionic energy converter could be heated by concentrated sunlight, or by thermally coupling the emitter to a heat source. Heating the emitter results in thermally produced electrons being emitted, i.e., escaping from the emitter or cathode. These electrons are approximately at the vacuum level, although they have some kinetic energy. The electrons are collected at the collector, which could also be called the anode 402.

Here, the collector anode 402 is a semiconductor material, particularly an N doped semiconductor material, N doped gallium arsenide in this example. The collector or anode 402 is illuminated, with laser light in this example, and thus has a reduced work function as a result of the surface photovoltage effect. The electrons drop down from the vacuum energy level 404 through the reduced work function and therefore have more energy available for performing electrical work, which is expressed as a voltage Vout across a load resistor (RL) 406. The collected electrons thus perform work equal to the current through the load resistor 406 times the voltage Vout across the load resistor, as the electrons are returned to the emitter or cathode 400 in a closed circuit. This amount of work, i.e., the efficiency of the apparatus, is increased by the decreasing of the work function at the collector or anode 402, which results in an increased voltage Vout across the load resistor 406. It should be appreciated that the electrical work available from the apparatus could be applied to various loads in practical applications.

FIG. 5 shows two effects on the thermionic energy converter of FIG. 3. As temperature increases (to the right), more electrons are thermally generated at the emitter, which increases efficiency of the device. As work function is decreased (upper curves have lower work function), efficiency of the device is increased.

FIG. 6 plots the efficiency of the thermionic energy converter versus the anode work function for a PETE device. Specific materials, without use of the surface photovoltage effect, are shown.

Figure 10:
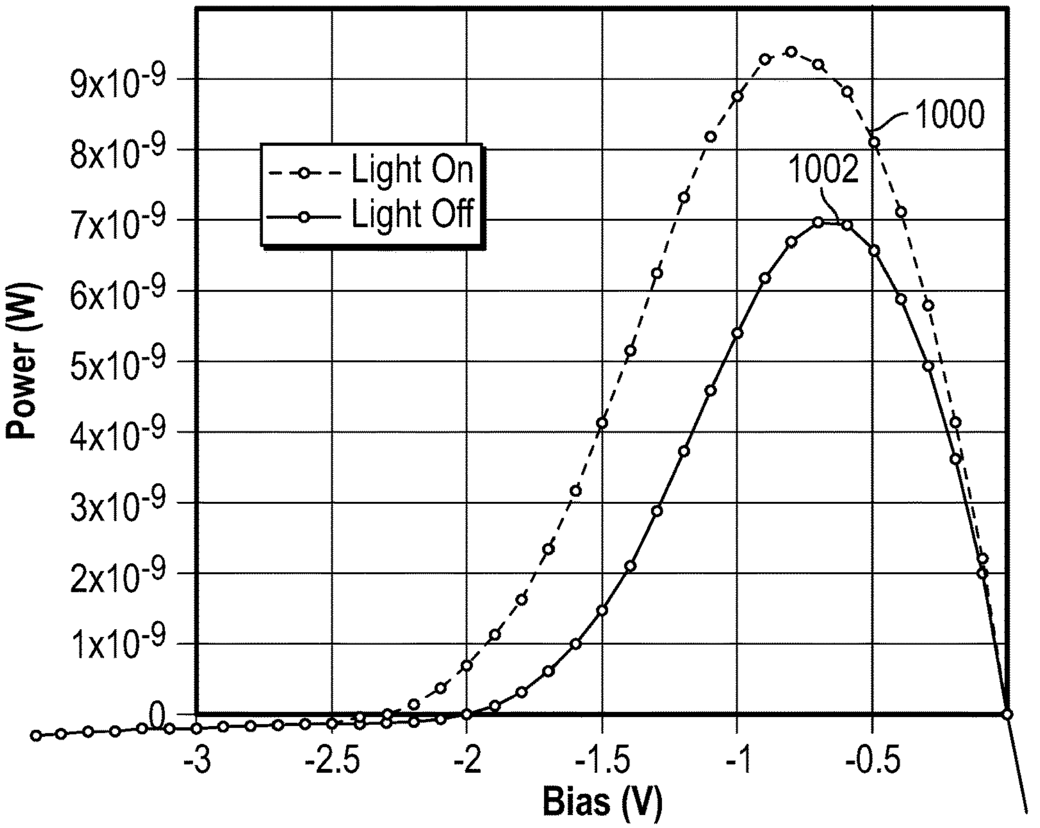
FIG. 10 is a power versus bias voltage diagram showing increased power with illumination on the anode of the thermionic energy converter of FIG. 7.
Figure 11:
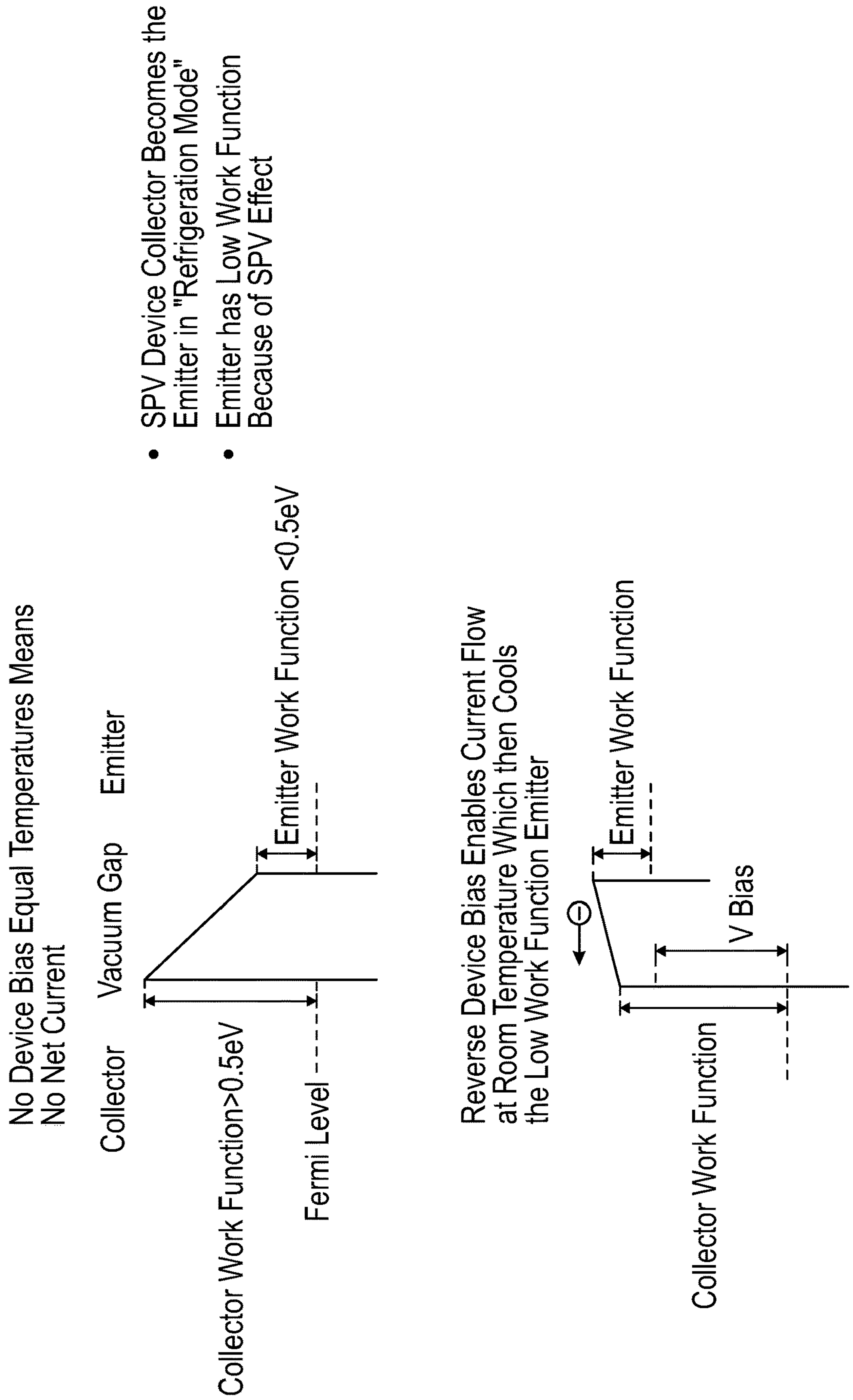
FIG. 11 is an energy level diagram showing energy levels without illumination (upper) and with illumination (lower) on an emitter in a refrigeration mode device. The work function of the emitter (lower, right) is reduced using the surface photovoltage effect.

FIG. 7 shows a thermionic energy converter in operation. The emitter or cathode 700, shown as an inverted V at the lower part of the photograph, is made of a wire, and is heated by passing an electric current through the wire. Thermally generated electrons are emitted from the cathode or emitter 700, and are collected by the anode or collector 702. The anode or collector 702 is the flat plate about midway in the diagram. A thermocouple, shown as a V shape in the upper half of the photograph, measures the temperature of the anode or collector. The anode or collector 702, which is made of N doped gallium arsenide, can be illuminated by laser light in order to decrease the work function. Results of operation are shown in FIGS. 9-11.

FIG. 8 shows how the sample for the thermionic energy converter of FIG. 7 is prepared in accordance with some embodiments. The semiconductor anode or collector is cleaned, e.g., with a 10% hydrochloric acid solution for 60 seconds with a deionized water rinse in air or a controlled environment such as nitrogen. Nickel contacts are then prepared and a thermocouple and copper wire is attached, and the device is cleaned again as above. The device and chamber are assembled under a nitrogen atmosphere then the chamber is pumped down to a low vacuum after being briefly exposed to air in some embodiments.

Figure 9:
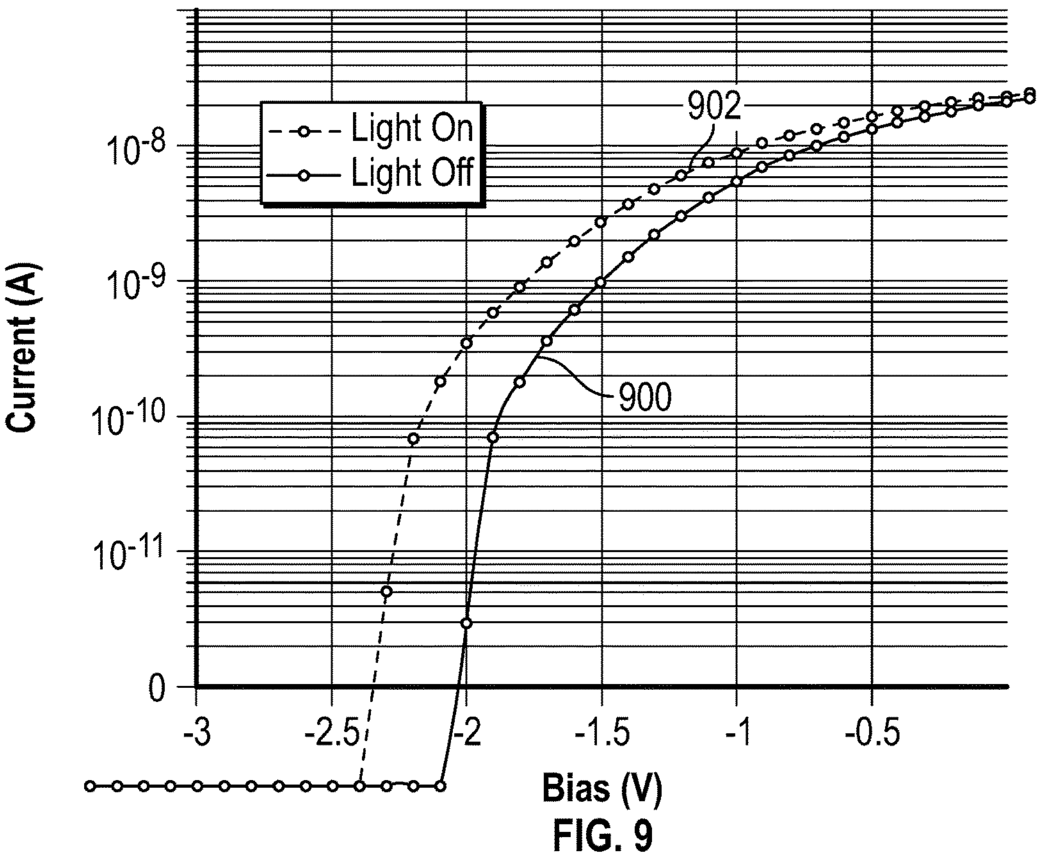
FIG. 9 is a current versus bias voltage diagram showing decreased bias voltage and/or increased current with illumination on the anode or collector of the thermionic energy converter of FIG. 7.

FIG. 9 shows the effect of the illumination on the anode or collector of the thermionic energy converter of FIG. 7 in accordance with some embodiments. Illuminating the anode or collector decreases the work function of the anode or collector, which increases the current for a given bias, and decreases the bias needed to achieve a specified current. Each of these increases the efficiency of the device. The curves 900 and 902 in FIG. 9 show approximately a 300 mV shift with the illumination on.

FIG. 10 again shows the effect of illuminating the anode or collector of the thermionic energy converter of FIG. 7. Illuminating the anode or collector decreases the work function, increasing the current and decreasing the voltage that the electrons drop from the vacuum level to the surface of the anode or collector. Both of these aspects increase the power produced by the device, as shown by curves 1000 and 1002 in FIG. 10.

Reversing the bias of the thermionic energy converter of FIG. 7 changes the principle of operation, and the device then becomes a refrigeration mode device as shown in FIG. 11. In the upper part of FIG. 11, the refrigeration mode device is shown with the members of the device at equal temperatures (i.e., no heating at what would be the cathode or emitter of the thermionic energy converter of FIG. 7), and no voltage bias between the members. The metal member, which is the cathode or emitter of the thermionic energy converter but which becomes the collector of the refrigeration mode device, has a work function greater than 0.5 eV in this example. The semiconductor member, which is the anode or collector of the thermionic energy converter but which becomes the emitter of the refrigeration mode device. In this embodiment, the device has a work function less than 0.5 eV as a result of applying the surface photovoltage effect (i.e., illuminating the semiconductor member).

In the lower part of FIG. 11, a reverse bias is applied (as compared to the thermionic energy converter), and electrons can then be emitted by the emitter and flow "downhill" to the collector of the refrigeration mode device. These electrons that are emitted by the emitter have some thermal energy, which is how they are excited to emit from the emitter. By removing these electrons from the emitter, thermal energy is removed from the emitter, which cools the low work function emitter. The reverse bias enables current flow at room temperature in this embodiment.

Figure 12:
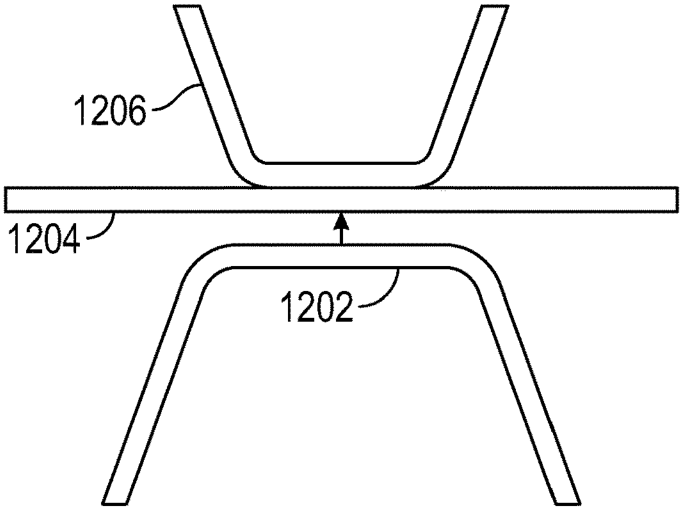
FIG. 12 is a projected view of the thermionic energy converter of FIG. 7.

FIG. 12 shows the members of the thermionic energy converter of FIG. 7. Electrons are emitted by the heated cathode 1202 or emitter, and travel across a gap to the illuminated anode 1204 or collector. The thermocouple 1206 measures temperature at the anode 1204 or collector.

Figure 13:
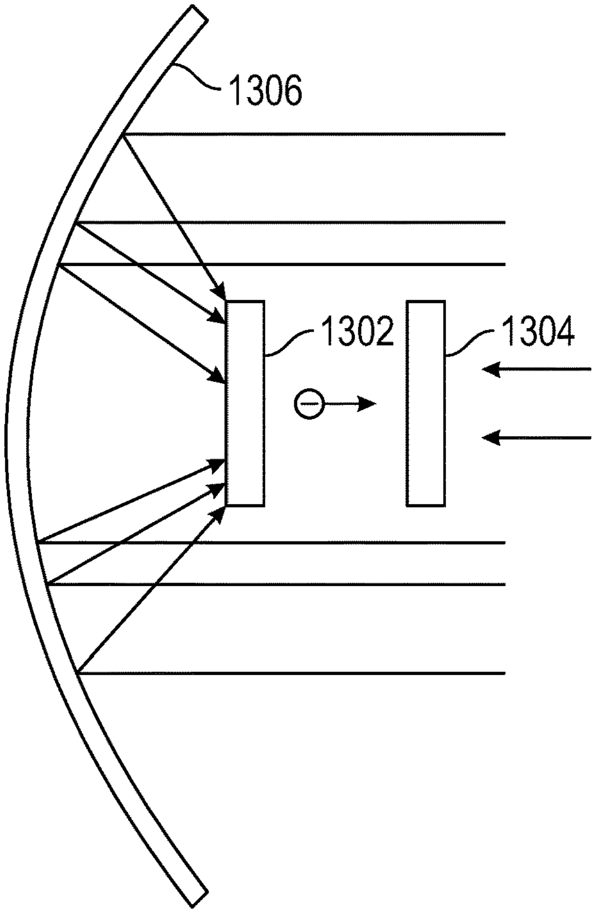
FIG. 13 is a cross-section view of a photon enhanced thermionic emission (PETE) device, showing electron emission from a heated cathode (left), and reduction of work function of an anode (right) made of N doped gallium arsenide through application of illumination and the surface photovoltage effect.

FIG. 13 shows a photon enhanced thermionic emission (PETE) device, in a solar energy application. Light rays (photons) reflect off of a reflector 1306, which could be a parabolic mirror or other light-concentrating device, and impinge on the emitter 1302. The emitter 1302 is heated, which thermally excites electrons much as in the thermionic energy converter. However, the emitter 1302 is a semiconductor device in the photon enhanced thermionic emission device. Particularly, in this example, the emitter 1302 is of P type semiconductor material, and electrons and holes are generated through the photoelectric effect, from the photons arriving at the emitter 1302. Thus, electrons emitted by the emitter 1302 are a combination of photo electrically generated and thermally generated electrons. These electrons are collected by the collector 1304. The collector 1304 is composed of metal, in one embodiment. In another embodiment, the collector 1304 is made of N type semiconductor material, which is then lightly illuminated, thus lowering the work function of the collector 1304 through application of the surface photovoltage effect. This illumination and lowering of the work function increase the efficiency of the photon enhanced thermionic emission device. In one example, the collector 1304 is illuminated with approximately one sun (i.e., sunlight that is not concentrated), and the emitter 1302 is illuminated with approximately one thousand suns (i.e., sunlight concentrated by one thousand times). In various embodiments, concentration ratios could be applied from 500 suns to 10,000 or 20,000 suns on the emitter, with 1% of that on the collector. In various embodiments, light could pass through to a collector surface, or bounce through to a collector surface, or a back side of a collector surface could be illuminated.

Figure 14:
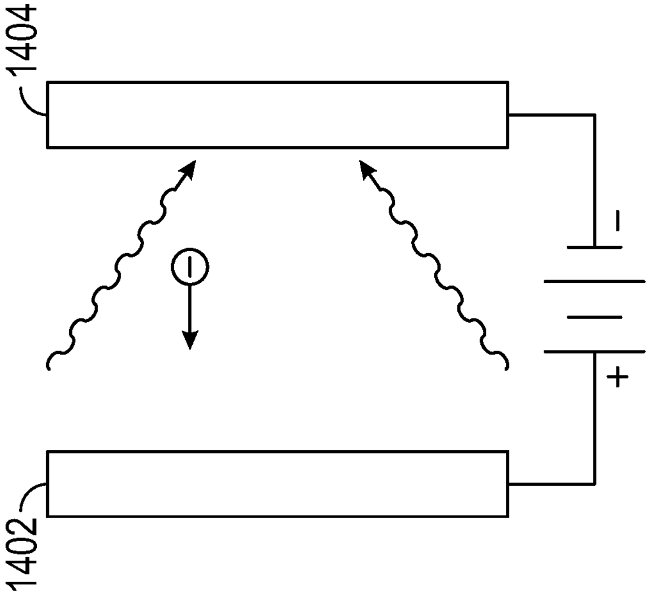
FIG. 14 is a schematic diagram showing operation of the refrigeration mode device of FIG. 11.

FIG. 14 shows operation of the refrigeration mode device of FIG. 11. Photons striking the emitter 1404 lower the work function of the emitter 1404 by application of the surface photovoltage effect. In this example, the emitter 1404 is made of a semiconductor material, particularly N doped semiconductor material. A bias voltage is applied, for example by a battery, so that the collector 1402 is biased positively with respect to the emitter 1404. Electrons from the emitter 1404, now able to escape from the emitter as a result of the reduced work function of the emitter 1404, are pulled by the electric field across to the collector 1402.

Electrons can then travel back from the collector 1402 through the biasing source to replenish electrons at the emitter 1404 in a closed circuit. Removal of the electrons remove thermal energy from the emitter 1404, which can be used to refrigerate an article to which the emitter 1404 is attached or embedded.

Figure 15A:
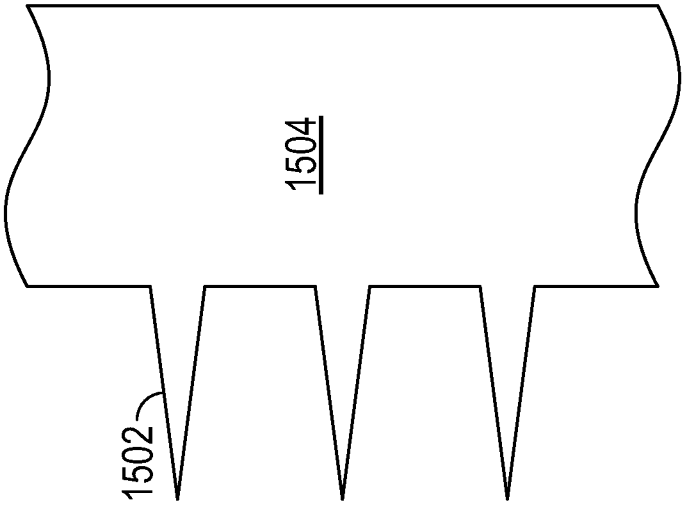
FIG. 15A is a magnified cross-section view showing a surface texture with points or spikes, which could be applied to a cathode or an anode in a surface photovoltage effect device.
Figure 15B:
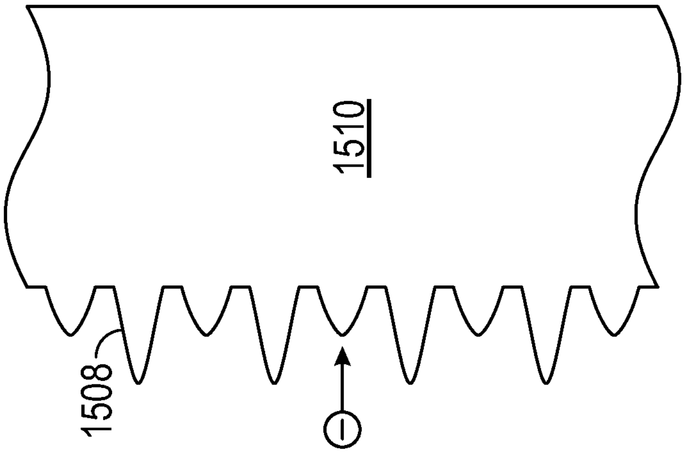
FIG. 15B is a magnified cross-section view showing a surface texture with roughening, which could be applied to an anode or collector in a variation of the thermionic energy converter of FIGS. 3 and 7, or to a collector in a variation of the refrigeration mode device of FIGS. 11 and 14.

FIGS. 15A and 15B show surfaces which could be applied in the various devices disclosed above. In FIG. 15A, a material 1504 has points or spikes on one surface, which would face towards an opposed member in one of the devices. If used for an emitter, the spikes or points could provide a "jumping off point" for electrons, which would improve efficiency of the device. If used for a collector, the spikes or points could concentrate the electric field from a bias voltage, and direct incoming electrons towards the collector, thereby improving efficiency of the device. In FIG. 15B a material 1510 has a rough surface 1508. If used for a collector, the rough surface could provide a "landing zone" for electrons, which would reduce elastic scattering of the electrons and improve efficiency of the device. Also, a textured surface could aid in light absorption, for improving the surface photovoltage effect, improving heating through light absorption, or improving photoelectric generating of electrons and holes, as appropriate to the disclosed devices.

It should be appreciated that the thermionic energy converter devices disclosed herein can be used for heat harvesting applications. In one embodiment, a thermionic energy converter is attached to a catalytic converter in an automobile or other transportation vehicle with an internal combustion engine. In one embodiment, a thermionic energy converter is used in a cogeneration system in a home or industrial application. In other embodiments, a thermionic energy converter is attached to a jet engine to generate electricity from the waste heat.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for tuning a work function in a thermionic emission device, comprising:

illuminating an N type semiconductor material of a first member of a thermionic emission device, wherein a work function of the N type semiconductor material is lowered by the illuminating; and collecting, on one of the first member or a second member of the thermionic emission device, electrons emitted from one of the first member or the second member;

heating the second member, wherein the second member acts as an emitter of electrons, wherein the first member of the thermionic emission device acts as a collector of the electrons, and wherein the thermionic emission device acts as a thermionic energy converter; and wherein illuminating the N type semiconductor material comprises illuminating the N type semiconductor material with light that has energy greater than the bandgap of the N type semiconductor material.

2. The method of claim 1, wherein the first member further comprises a work function lowering coating.

3. The method of claim 2, wherein the work function lowering coating comprises at least one element selected from the group consisting of: cesium, barium, strontium, and calcium.

4. The method of claim 3, wherein the work function lowering coating comprises cesium oxide.

5. The method of claim 2, wherein the work function lowering coating comprises cesium.

6. The method of claim 2, wherein the N type semiconductor material comprises a material selected from the group consisting of: gallium arsenide, silicon, gallium nitride, silicon carbide, and zinc oxide.

7. The method of claim 2, wherein the N type semiconductor material comprises at least one of gallium arsenide or silicon.

8. The method of claim 2, wherein the N type semiconductor material comprises N type gallium arsenide.

9. The method of claim 2, wherein the N type semiconductor material comprises N type silicon.

10. The method of claim 1, wherein illuminating the N type semiconductor material comprises receiving light from a source external to the second member, wherein the N type semiconductor material is illuminated by the light.

11. The method of claim 1, wherein the N type semiconductor material comprises a material selected from the group consisting of: gallium arsenide, silicon, gallium nitride, silicon carbide, and zinc oxide.

12. The method of claim 1, wherein the N type semiconductor material comprises at least one of gallium arsenide or silicon.

13. The method of claim 1, wherein the N type semiconductor material comprises N type gallium arsenide.

14. The method of claim 1, wherein the N type semiconductor material comprises N type silicon.

15. A method for tuning a work function in a thermionic emission device, comprising:

illuminating an N type semiconductor material of a first member of a thermionic emission device, wherein a work function of the N type semiconductor material is lowered by the illuminating;

collecting, on one of the first member or a second member of the thermionic emission device, electrons emitted from one of the first member or the second member; and applying a bias voltage between the first member and the second member, wherein the second member is biased to a positive voltage with respect to the first member, wherein the first member acts as an emitter of electrons, wherein the second member acts as a collector of the electrons, and wherein the thermionic emission device acts as a refrigeration mode device with the first member reducing a temperature as a result of the illuminating and the applying the bias voltage.

16. A method for tuning a work function in a thermionic emission device, comprising:

illuminating an N type semiconductor material of a first member of a thermionic emission device, wherein a work function of the N type semiconductor material is lowered by the illuminating;

collecting, on one of the first member or a second member of the thermionic emission device, electrons emitted from one of the first member or the second member; and illuminating a P type semiconductor material of the second member, wherein the second member acts as a cathode, wherein the first member acts as an anode, and wherein the thermionic emission device acts as a photon enhanced thermionic emission (PETE) energy converter.

* * * * *